(12) United States Patent
Lundquist et al.

(10) Patent No.: US 11,717,873 B2
(45) Date of Patent: Aug. 8, 2023

(54) METHOD AND APPARATUS FOR IMPACTING METAL PARTS

(71) Applicant: The Boeing Company, Chicago, IL (US)

(72) Inventors: Lauren K. Lundquist, Maple Valley, WA (US); David G. Jensen, Auburn, WA (US); McKay A. Kunz, Buckley, WA (US); Gregory L. Ramsey, Seabeck, WA (US); Michael Delos McGraw, Bonney Lake, WA (US); James E. Pillers, Seattle, WA (US); Nate Speer, Bonney Lake, WA (US)

(73) Assignee: The Boeing Company, Arlington, VA (US)

(*) Notice: Subject to any disclaimer, the term of this patent is extended or adjusted under 35 U.S.C. 154(b) by 99 days.

(21) Appl. No.: 16/752,143

(22) Filed: Jan. 24, 2020

(65) Prior Publication Data
US 2020/0164422 A1 May 28, 2020

Related U.S. Application Data

(60) Division of application No. 14/675,465, filed on Mar. 31, 2015, now Pat. No. 10,576,523, which is a
(Continued)

(51) Int. Cl.
*B21D 31/06* (2006.01)
*B21D 53/88* (2006.01)
(Continued)

(52) U.S. Cl.
CPC ............... *B21D 31/06* (2013.01); *B21D 1/06* (2013.01); *B21D 1/12* (2013.01); *B21D 22/00* (2013.01);
(Continued)

(58) Field of Classification Search
CPC . B21D 1/06; B21D 1/065; B21D 1/12; B21D 31/06; B21D 31/005; B21J 7/00;
(Continued)

(56) References Cited

U.S. PATENT DOCUMENTS 1,301,333 A * 4/1919 Stickney ................. B44B 5/026
101/28
2,390,795 A * 12/1945 Kotowicz ................ B21D 1/06
72/437
(Continued)

FOREIGN PATENT DOCUMENTS

CN 102116359 7/2011
DE 102009018998 A1 * 10/2010 ................ B23P 9/04
(Continued)

OTHER PUBLICATIONS

Translation DE102009018998 A1; Bamberg et al. Oct. 2010.*
(Continued)

*Primary Examiner* — Edward T Tolan
(74) *Attorney, Agent, or Firm* — Kunzler Bean & Adamson

(57) ABSTRACT

A driven member of a metal peening machine is disclosed. The metal peening machine is configured to drive the driven member into contact with a work surface of a metal workpiece to deform the metal workpiece. The driven member includes a shaft with an impact end. The driven member includes least one of a plurality of impact features, an impact feature with a non-flat impact surface, a non-round impact feature, and an asymmetrical impact feature that is coupled to and protrudes from the impact end of the shaft. The at least one of the plurality of impact features, the impact feature with a non-flat impact surface, the non-round impact feature, and the asymmetrical impact feature define at least
(Continued)

one impact surface to be driven into contact with the work surface of the metal workpiece.

20 Claims, 10 Drawing Sheets

Related U.S. Application Data continuation-in-part of application No. 14/031,690, filed on Sep. 19, 2013, now Pat. No. 8,997,545.

(51) Int. Cl.
| | |
|---|---|
| B21D 37/00 | (2006.01) |
| B21D 22/00 | (2006.01) |
| B21D 22/18 | (2006.01) |
| B21D 22/02 | (2006.01) |
| B21D 1/06 | (2006.01) |
| B21D 1/12 | (2006.01) |
| B21D 22/06 | (2006.01) |

(52) U.S. Cl.
CPC ............. *B21D 22/02* (2013.01); *B21D 22/06* (2013.01); *B21D 22/18* (2013.01); *B21D 37/00* (2013.01); *B21D 53/88* (2013.01)

(58) Field of Classification Search
CPC ..... B21J 7/04; B25D 1/02; B25D 1/14; B25D 17/06; B23P 9/04; C21D 7/04; B44B 5/0019; B44B 5/0052; B44B 5/026
USPC ............................................................. 81/26
See application file for complete search history.

(56) References Cited

U.S. PATENT DOCUMENTS

| | | | |
|---|---|---|---|
| 2,483,626 A | 10/1949 | Daku | |
| 2,623,426 A * | 12/1952 | Daniels | B21D 1/065 72/479 |
| 2,670,527 A * | 3/1954 | Roper | B21D 1/06 72/379.2 |
| 2,888,846 A * | 6/1959 | Peras | B23P 9/04 29/90.01 |
| 3,451,490 A | 6/1969 | Froike | |
| 3,705,511 A | 12/1972 | Brandel et al. | |
| 3,780,926 A * | 12/1973 | Davis | B29C 65/08 228/1.1 |
| 3,896,864 A * | 7/1975 | Green | B60C 29/00 81/19 |
| 3,937,055 A | 2/1976 | Caruso et al. | |
| 3,961,519 A * | 6/1976 | Kurata | B21D 1/06 72/466.6 |
| 4,220,035 A * | 9/1980 | Jansen-Herfeld | B21D 1/06 72/413 |
| 4,349,074 A | 9/1982 | Ince | |
| 4,416,130 A | 11/1983 | Judge, Jr. | |
| 4,593,767 A | 6/1986 | Isenring et al. | |
| 4,694,672 A | 9/1987 | Baughman | |
| 4,937,421 A | 6/1990 | Ortiz et al. | |
| 4,974,434 A | 12/1990 | Reccius et al. | |
| 5,119,667 A | 6/1992 | Hollis et al. | |
| 5,461,900 A * | 10/1995 | Gutierrez | B21D 1/06 81/463 |
| 5,742,028 A | 4/1998 | Mannava et al. | |
| 5,771,729 A | 6/1998 | Bailey et al. | |
| 6,014,885 A | 1/2000 | Griffaton | |
| 6,216,508 B1 | 4/2001 | Matsubara et al. | |
| 6,343,495 B1 | 2/2002 | Cheppe et al. | |
| 6,410,884 B1 | 6/2002 | Hackel et al. | |
| 6,532,786 B1 | 3/2003 | Luttgeharm | |
| 6,664,506 B2 | 12/2003 | Clauer et al. | |
| 6,670,578 B2 | 12/2003 | Hackel et al. | |
| 6,698,268 B2 | 3/2004 | Woods et al. | |
| 6,742,377 B2 | 6/2004 | Woods et al. | |
| 6,862,913 B2 | 3/2005 | Lempenauer et al. | |
| 6,932,876 B1 | 8/2005 | Statnikov | |
| 7,276,824 B2 * | 10/2007 | Statnikov | C21D 7/04 310/26 |
| 7,431,779 B2 | 10/2008 | Statnikov | |
| 8,011,096 B2 * | 9/2011 | Reeb | B21H 7/185 72/460 |
| 8,033,151 B2 | 10/2011 | Castle et al. | |
| 8,302,450 B2 | 11/2012 | Slattery et al. | |
| 8,316,524 B1 | 11/2012 | LeMieux | |
| 8,323,427 B1 | 12/2012 | Slattery et al. | |
| 8,645,086 B1 | 2/2014 | Castle et al. | |
| 8,813,537 B1 | 8/2014 | Diego | |
| 8,858,853 B2 | 10/2014 | Huskamp et al. | |
| 8,997,545 B1 | 4/2015 | Lundquist et al. | |
| 9,545,710 B2 * | 1/2017 | Boice | B25D 5/02 |
| 9,682,418 B1 | 6/2017 | Young et al. | |
| 10,144,048 B2 * | 12/2018 | Kiridena | B21D 31/005 |
| 2002/0096504 A1 | 7/2002 | Hackel et al. | |
| 2003/0172779 A1 * | 9/2003 | Souder | B28D 1/00 81/26 |
| 2006/0272378 A1 | 12/2006 | Amino et al. | |
| 2007/0234772 A1 | 10/2007 | Prevey | |
| 2008/0178708 A1 * | 7/2008 | Wheat | B25D 1/02 81/26 |
| 2008/0308199 A1 | 12/2008 | Locker | |
| 2010/0257910 A1 | 10/2010 | Castle et al. | |
| 2014/0007394 A1 | 1/2014 | Haas | |
| 2015/0075240 A1 | 3/2015 | Lundquist et al. | |
| 2015/0114074 A1 * | 4/2015 | Guo | B24B 39/006 72/372 |
| 2017/0165736 A1 | 6/2017 | Jensen et al. | |

FOREIGN PATENT DOCUMENTS

| | | | | |
|---|---|---|---|---|
| DE | 102011010297 A1 * | 8/2012 | ............... | C21D 7/04 |
| EP | 1528110 | 5/2005 | | |
| JP | 3-257121 A * | 11/1991 | ............... | C21D 7/04 |
| JP | 2000301248 | 10/2000 | | |
| JP | 2003521378 | 7/2003 | | |
| JP | 2004130369 | 4/2004 | | |
| JP | 2013116492 | 6/2013 | | |
| WO | 8203192 | 9/1982 | | |
| WO | 2004028739 | 4/2004 | | |

OTHER PUBLICATIONS

Translation DE102011010297A; Raab et al. Aug. 2012.*
Translation JP 3-257121A; Sujita et al. Nov. 1991.*
DE 102013019397 A1, Wiese May 2015.*
DE 202012007473 U1, Slepakov Oct. 2012.*
Deboer, Clint "How's It Work? Rotary Hammers", published on ProTool Reviews vol. 1 Issue May 3, 2013.
DeWalt Product Service website Model D25831 http://servicenet.dewalt.com/Products/Detail?productNumber=D25831K.
Didier, Will, "Development and Validation of a Mathematical Model for Predicting the Performance of Rotary Hammer Drills" (2013). University of Wisconsin Milwaukee UWM Digital Commons Theses and Dissertations. Paper 88.
Sonats Utlrasonic Needle Straightening or Forming website, http://www.sonats-et.com/page_21-needle-straightening.html, accessed Mar. 18, 2015.
Bleicher et al, Mechanism of surface modification using machine hammer peening technology, CIRP Annals-Manufacturing Technology, 2012, pp. 375-378, vol. 61.
Extended European Search Report for Patent Application No. 14176571.9 dated Feb. 20, 2015.
Office Action for Canadian Patent Application No. 2,858,399 dated Dec. 2, 2015.
Office Action for EP Patent Application No. 14176571.9 dated Oct. 6, 2016.
Examination Report for Australian Patent Application No. AU2014204472 dated May 10, 2017.
Office Action for Chinese Patent Application No. 201410413064.4 dated Nov. 16, 2017.

(56) References Cited

OTHER PUBLICATIONS

Office Action for Chinese Patent Application No. 201410413064.4 dated Apr. 2, 2018.
Decision of Rejection for Chinese Patent Application No. 201410413064.4 dated Jun. 29, 2018.
Office Action for Japanese Patent Application No. 2014-172960 dated Mar. 26, 2019.
Office Action for EP Patent Application No. 14176571.9 dated Oct. 1, 2018.
Office Action for EP Patent Application No. 14175916.7 dated Jun. 6, 2017.
Extended European Search Report for EP Patent Application No. 14175916.7 dated Mar. 6, 2015.

* cited by examiner

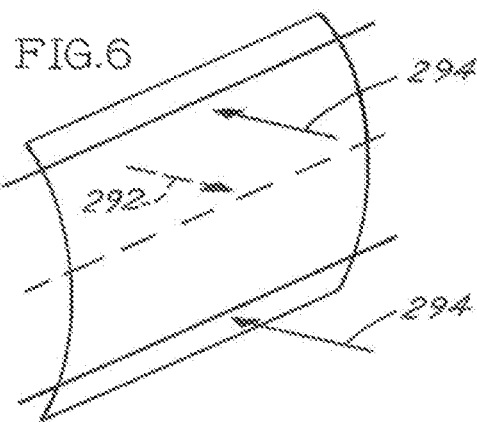
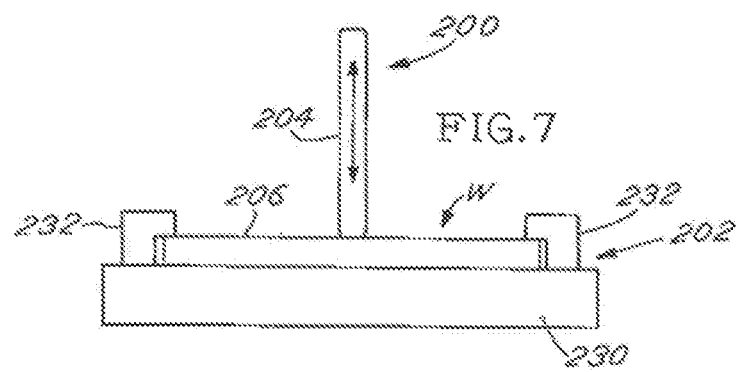
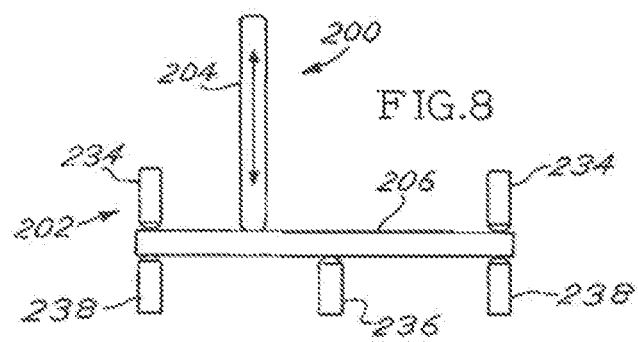

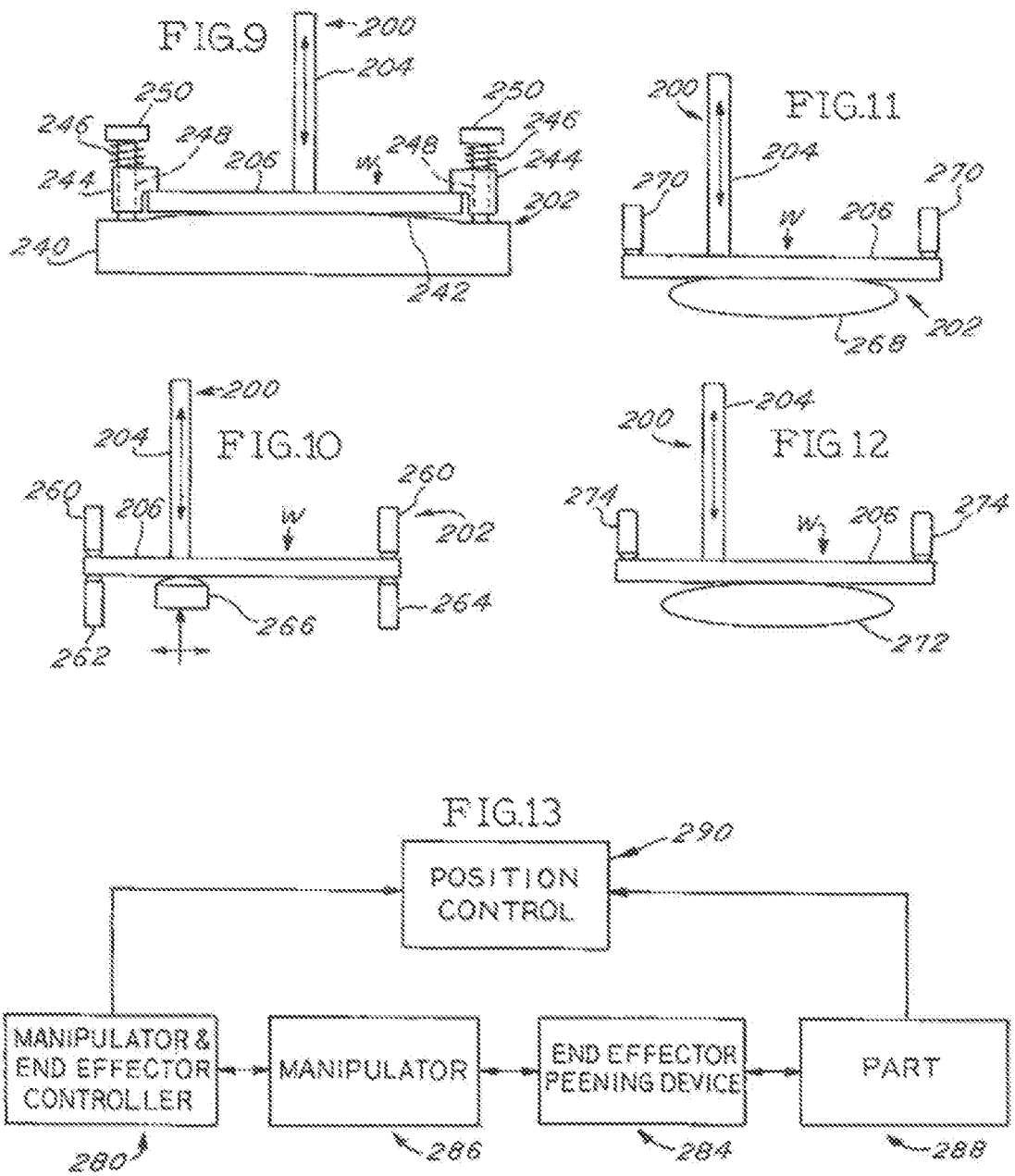

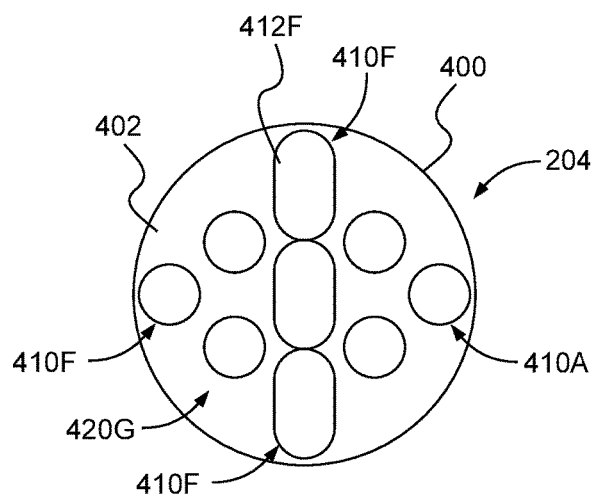
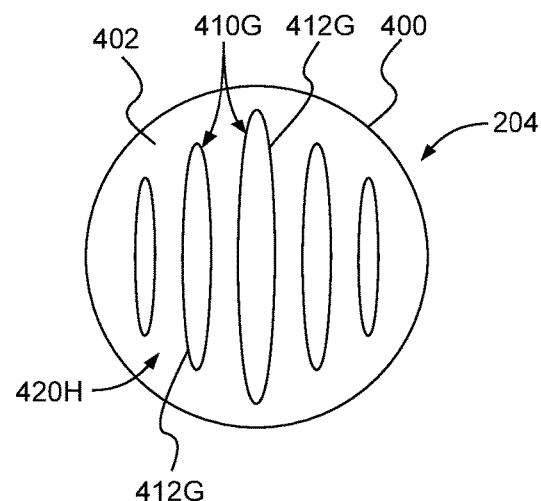
FIG. 20A  FIG. 20B
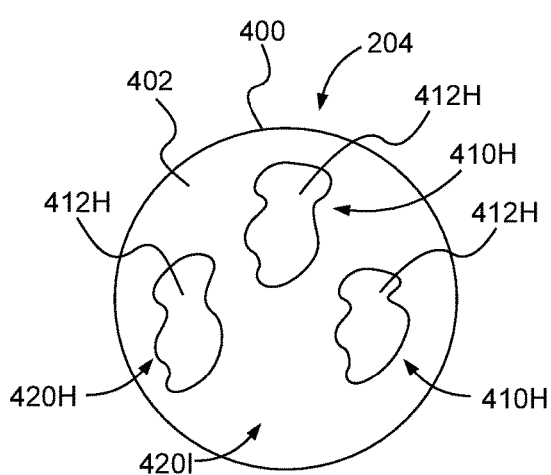
FIG. 20C

METHOD AND APPARATUS FOR IMPACTING METAL PARTS

CROSS-REFERENCE TO RELATED APPLICATIONS

The present application is a divisional of U.S. patent application Ser. No. 14/675,465, filed Mar. 31, 2015, which is a continuation-in-part of U.S. patent application Ser. No. 14/031,690, filed Sep. 19, 2013, which is related to U.S. patent application Ser. No. 14/031,771, filed Sep. 19, 2013, all of which are incorporated herein by reference.

FIELD

The disclosure relates to the use of mechanical systems to change physical characteristics of metal parts. More specifically, the disclosure relates to a method and apparatus for mechanically processing, such as by impact peening, metal workpieces into final metal components for aircraft and aerospace applications.

BACKGROUND

Currently, metal parts are fabricated from sheet and plate product forms into, but not limited to, fuselage skins, wing skins, and other structures for aircraft by using systems including shot peening, ultrasonic peening, and laser peening. Shot peening works well on thinner material but is difficult to control, such as when precision processing of a part is required. For thicker materials, large shot peening is required to process the part. Large shot peening may damage the surface of the part to the point where additional processing steps may be required to meet surface finish requirements. Ultrasonic peening and laser peening are used on both thick and thin metal components, but such systems require a substantial amount of time to process the metal components into the desired final condition. Additionally, laser peening requires high investment levels for both initial capital and later recurring costs. A need exists for providing an easily adjustable mechanical system to process components varying from thin sheet metal to those greater than one inch thick, where precise finishing of such metal components may be achieved more economically than presently available.

Conventional machines for peening metal parts have a limited range of available impact energies and impact reciprocation rates. Such limitations of metal peening machines correspondingly limit the types, materials, and geometries of the parts formed by the machines.

Further limitations and disadvantages of conventional and traditional approaches will become apparent to one of skill in the art, through comparison of such systems with the present disclosure as set forth in the remainder of the present application with reference to the drawings.

SUMMARY

The subject matter of the present application has been developed in response to the present state of the art, and in particular, in response to shortcomings of conventional impact peening systems for forming metal parts. The subject matter of the present application provides embodiments of metal peening systems, apparatuses, and methods that overcome at least some of the above-discussed shortcomings of prior art techniques. For example, according to some embodiments, a metal peening system of the present application includes a driven member or impactor with at least one of a plurality of impact features, an asymmetrical impact feature, or a non-round impact feature. Such an impactor is useful to increase the effective operational range of metal peening machines thereby broadening the types, materials, and geometries of parts capable of being formed by the metal peening machines.

According to a first example, an apparatus for changing physical characteristics of a metal workpiece having a surface includes a support for the workpiece. The apparatus also includes a driven member for applying multiple impacts to a surface of the workpiece. Further, the apparatus includes a controller that has adjustable parameters operatively connected to the driven member to operate the driven member for applying multiple impacts against the surface of the workpiece within a range of the adjustable parameters for changing physical characteristics of the metal workpiece. The apparatus additionally includes a fixture for pre-loading the workpiece while the driven member applies impacts to the workpiece.

According to a second example, an apparatus for changing physical characteristics of a metal workpiece having a surface includes a support for the workpiece and a driven member for applying multiple impacts to a surface of the workpiece. The apparatus also includes a controller that has adjustable parameters operatively connected to the driven member to operate the driven member for applying multiple impacts against the surface of the workpiece within a range of the adjustable parameters for changing physical characteristics of the metal workpiece. The support for the workpiece has a surface and wherein the workpiece has a second surface which bears against the surface of the support. Additionally, the support for the workpiece includes at least one clamp bearing against the surface of the workpiece and the support further includes at least one additional clamp bearing against the second surface of the workpiece.

In one implementation of the second example, the support includes further clamps that bear against the second surface of the workpiece and directly oppose the clamps bearing against the surface of the workpiece.

According to a third example, an apparatus for changing physical characteristics of a metal workpiece having a surface includes a support for the workpiece and a driven member for applying multiple impacts to a surface of the workpiece. The apparatus also includes a controller that has adjustable parameters operatively connected to the driven member to operate the driven member for applying multiple impacts against the surface of the workpiece within a range of the adjustable parameters for changing physical characteristics of the metal workpiece. The support for the workpiece has a surface and wherein the workpiece has a second surface which bears against the surface of the support. The support further includes biased clamps for securing the workpiece on the support and for securing the workpiece against the surface of the support.

According to a fourth example, an apparatus for changing physical characteristics of a metal workpiece having a surface includes a support for the workpiece and a driven member for applying multiple impacts to a surface of the workpiece. The apparatus also includes a controller that has adjustable parameters operatively connected to the driven member to operate the driven member for applying multiple impacts against the surface of the workpiece within a range of the adjustable parameters for changing physical characteristics of the metal workpiece. The support for the workpiece has a surface and wherein the workpiece has a second surface which bears against the surface of the support. The support further includes an air bladder anvil bearing against the second surface of the workpiece, and the apparatus further includes a pair of spaced clamps bearing against the surface of the workpiece.

In one implementation of the fourth example, the air bladder anvil is a preformed and shaped air bladder anvil.

According to a fifth example, an apparatus for changing physical characteristics of a metal workpiece having a surface includes a support for the workpiece and a driven member for applying multiple impacts to a surface of the workpiece. The apparatus also includes a controller that has adjustable parameters operatively connected to the driven member to operate the driven member for applying multiple impacts against the surface of the workpiece within a range of the adjustable parameters for changing physical characteristics of the metal workpiece. Additionally, the apparatus includes a crank mechanism for driving the driven member. The crank mechanism has a continuous reciprocally moving ram. The ram creates energy transformed into impact energy by the driven member. The impact energy moves as a stress wave from the driven member into the surface of the workpiece.

According to a sixth example, a driven member of a metal peening machine is disclosed. The metal peening machine is configured to drive the driven member into contact with a work surface of a metal workpiece to deform the metal workpiece. The driven member includes a shaft with an impact end. At least one of a plurality of impact features, an impact feature with a non-flat impact surface, a non-round impact feature, and an asymmetrical impact feature is coupled to and protrudes from the impact end of the shaft. The at least one of the plurality of impact features, the impact feature with a non-flat impact surface, the non-round impact feature, and the asymmetrical impact feature defining at least one impact surface to be driven into contact with the work surface of the metal workpiece.

In some implementations of the sixth example, the plurality of impact features are coupled to and protrude from the impact end of the shaft. Each of the plurality of impact features defines an impact surface. In one implementation of the sixth example, the plurality of impact features are uniformly spaced about the impact end. In one implementation of the sixth example, the plurality of impact features are non-uniformly spaced about the impact end. According to some implementations of the sixth example, each of the plurality of impact features comprises a rounded bump protruding from the impact end of the shaft. In certain implementations if the sixth example, the plurality of impact features are arranged in a symmetrical pattern about the impact end. In some implementations of the sixth example, the plurality of impact features are arranged in an asymmetrical pattern about the impact end. The plurality of impact features collectively define a textured impact surface in an implementation of the sixth example. According to certain implementations of the sixth example, at least one of the impact features of the plurality of impact features defines an impact surface with a non-round peripheral shape. The non-round peripheral shape of the impact surface can be asymmetrical. At least one of the impact features with the non-round peripheral shape may include an elongate ridge. According to one implementation of the sixth example, at least one of the plurality of impact features protrudes from the impact end a first distance, and at least one of the plurality of impact features protrudes from the impact end a second distance, where the first distance is different than the second distance. In certain implementations of the sixth example, at least one of the impact features of the plurality of impact features defines an impact surface having a first peripheral shape, and at least one of the impact features of the plurality of impact features defines an impact surface having a second peripheral shape, where the first peripheral shape is different than the second peripheral shape.

According to some implementations of the sixth example, the non-round impact feature is coupled to and protrudes from the impact end of the shaft. The non-round impact feature defines an impact surface with a non-round peripheral shape. The non-round peripheral shape of the impact surface can have a length greater than a width. The non-round peripheral shape of the impact surface can have an elliptical shape. The non-round peripheral shape of the impact surface may have a rectangular shape or square shape. The non-round impact feature can include an elongate ridge.

In certain implementations of the sixth example, the asymmetrical impact feature is coupled to and protrudes from the impact end of the shaft. The asymmetrical impact feature defines an impact surface with an asymmetrical peripheral shape.

According to certain implementations of the sixth example, the asymmetrical impact feature is coupled to and protrudes from the impact end of the shaft. The asymmetrical impact feature being asymmetrical relative to a plane parallel to a driving direction of the driven member when driven by the metal peening machine.

In a seventh example, a metal peening machine for forming a metal workpiece includes a driven member for applying multiple impacts to a surface of the workpiece. The driven member includes at least one of a plurality of impact features, an impact feature with a non-flat impact surface, a non-round impact feature, and an asymmetrical impact feature. Each of the plurality of impact features, impact feature with a non-flat impact surface, non-round impact feature, and asymmetrical impact feature define at least one impact surface to be driven into contact with the surface of the metal workpiece. The metal peening machine also includes a device for driving the driven member. Additionally, the metal peening machine includes a controller that is operably coupled to the device to control impact characteristics of the driven member.

According to some implementations of the seventh example, the metal peening machine also includes a plurality of interchangeable driven members each separately drivable by the device. Each of the plurality of interchangeable driven members has a different configuration of the at least one of the plurality of impact features, impact feature with a non-flat impact surface, non-round impact feature, and asymmetrical impact feature.

In an eighth example, a method of deforming a metal workpiece includes repeatedly impacting a surface of the metal workpiece with a driven member. The driven member includes at least one of a plurality of impact features, an impact feature with a non-flat impact surface, a non-round impact feature, and an asymmetrical impact feature. Each of the plurality of impact features, impact feature with a non-flat impact surface, non-round impact feature, and asymmetrical impact feature define at least one impact surface to be driven into contact with the surface of the metal workpiece. The method also includes setting impact characteristics of the driven member responsive to a configuration of the at least one of the plurality of impact features, impact feature with a non-flat impact surface, non-round impact feature, and asymmetrical impact feature defining at least one impact surface to be driven into contact with the surface of the metal workpiece.

According to some implementations of the eighth example, the driven member includes the plurality of impact features. Setting impact characteristics of the driven member includes setting one of a relatively high impact energy, relatively high impact reciprocation rate of the driven member, relatively low feed rate, and relatively small step-over distance corresponding with a higher quantity of impact features, and setting one of a relatively low impact energy, relatively low impact reciprocation rate of the driven member, relatively high feed rate, and relatively large step-over distance corresponding with a lower quantity of impact features.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the features, functions, and advantages of the subject matter may be more readily understood, a more particular description of the subject matter briefly described above will be rendered by reference to specific embodiments that are illustrated in the appended drawings. Understanding that these drawings depict only typical embodiments of the subject matter, they are not therefore to be considered to be limiting of its scope. The subject matter will be described and explained with additional specificity and detail through the use of the drawings, in which:

FIG. 6 is a schematic perspective view showing a pre-load force being applied on the concave side of a workpiece while being held in the fixtures of FIG. 4 or 5:

FIG. 7 is a schematic side view of one embodiment of a workpiece being held in place by clamps on the surface of a support while impacts are being applied to the workpiece by a driven member;

FIG. 8 is a schematic side view similar to FIG. 7 of another embodiment of a workpiece being held in place by clamps while impacts are being applied to the workpiece by a driven member;

FIG. 9 is a schematic side view similar to FIGS. 7 and 8 of still another embodiment of a workpiece positioned on (e.g., forcibly conformed to) a raised anvil surface of a support while being held in place by biasing clamps;

FIG. 10 is a schematic side view yet another embodiment, similar to FIGS. 7-9, of a workpiece being held in place by clamps with a movable anvil opposing a driven member applying impacts to the workpiece;

FIG. 11 is a schematic side view of yet a further embodiment, similar to FIGS. 7-10, showing an air bladder or non-rigid anvil supporting the lower surface of the workpiece while a drive member applies impacts to the upper surface of the workpiece and while clamps hold the workpiece in place on the anvil;

FIG. 12 is a schematic side view, similar to FIGS. 7-11, showing another embodiment of an air bladder or non-rigid anvil supporting the lower surface of a workpiece and opposing the driven member against a surface of the workpiece while being held in place by clamps, FIG. 13 is a flow diagram representing one embodiment of an apparatus and method for impacting a workpiece;

FIG. 20A is a bottom plan view of a driven member that includes a plurality of non-round impact features according to one embodiment;

FIG. 20B is a bottom plan view of a driven member that includes a plurality of non-round impact features according to another embodiment;

FIG. 20C is a bottom plan view of a driven member that includes a plurality of non-round and asymmetrical impact features according to yet another embodiment.

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Figure 14:
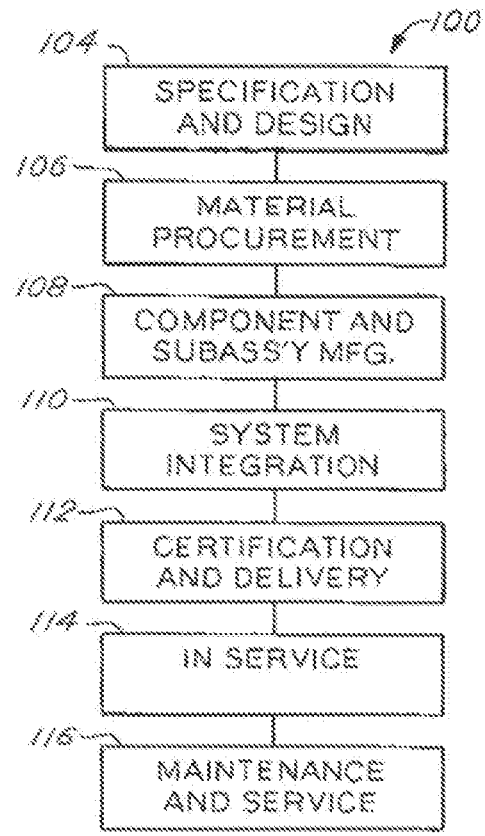
FIG. 14 is a flow diagram of one embodiment of an aircraft production and service methodology.
Figure 15:
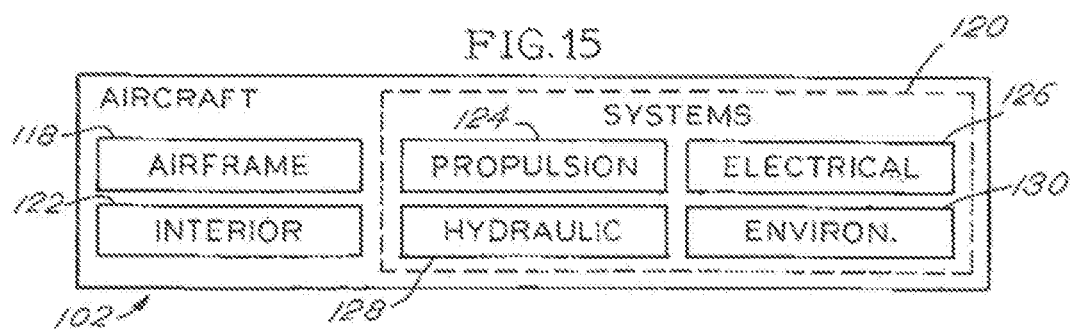
FIG. 15 is a block diagram of one embodiment of an aircraft.

Referring to the drawings, examples of the disclosure may be described in the context of an aircraft manufacturing and service method 100 as shown in FIG. 14 and an aircraft 102 as shown in FIG. 15. During pre-production, exemplary method 100 may include specification and design 104 of the aircraft 102 and material procurement 106. During production, component and subassembly manufacturing 108 and system integration 110 of the aircraft 102 take place. Thereafter, the aircraft 102 may go through certification and delivery 112 in order to be placed in service 114. While in service by a customer, the aircraft 102 is scheduled for routine maintenance and service 116 (which may also include modification, reconfiguration, refurbishment, and so on).

Each of the processes of method 100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 15, the aircraft 102 produced by exemplary method 100 may include an airframe 118 with a plurality of systems 120 and an interior 122. Examples of high-level systems 120 include one or more of a propulsion system 124, an electrical system 126, a hydraulic system 128, and an environmental system 130. Any number of other systems may be included. Although an aerospace example is shown, the principles of the disclosure may be applied to other industries, such as the automotive industry.

Apparatus and methods embodied herein may be employed during any one or more of the stages of the production and service method 100. For example, components or subassemblies corresponding to production process 108 may be fabricated or manufactured in a manner similar to components or subassemblies produced while the aircraft 102 is in service. Also, one or more apparatus example, method example, or a combination thereof may be utilized during the production stages 108 and 110, for example, by substantially expediting assembly of or reducing the cost of an aircraft 102. Similarly, one or more of apparatus example, method example, or a combination thereof may be utilized while the aircraft 102 is in service, for example and without limitation, to maintenance and service 116.

Referring to FIGS. 14 and 15, the description of the present disclosure to be hereinafter provided generally falls within the component and subassembly manufacturing substep 108 and also generally falls within the airframe 118 of the aircraft 102.

As shown in the FIGS., the present disclosure is directed to an apparatus and method for changing physical characteristics of metal workpieces or parts by multiple impacts. The workpiece W may be sheet metal, a metal plate, an extrusion, or an assembly and may have a thickness range of 0.062 to 2.00 inches. Each workpiece W may have different dimensions in length, width, and thickness. Moreover, each workpiece W may have multiple surfaces, which receive multiple impacts. The metal itself may be any metal, such as aluminum, titanium, or metal alloys. In essence, the metal or metal alloy workpiece W may exist in a variety of geometries and configurations.

Figure 1:
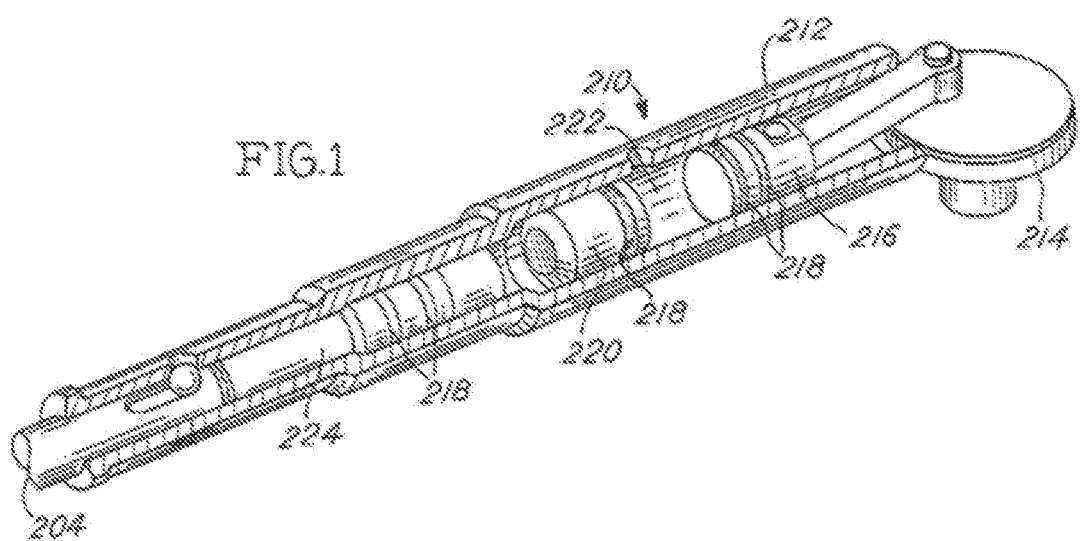
FIG. 1 is a broken-away, perspective view of the interior of one embodiment of a rotary impact device used for processing a workpiece with a driven member or impactor for achieving a final component.
Figure 2:
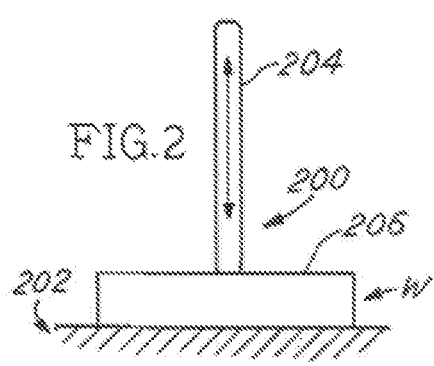
FIG. 2 is a schematic side view of a driven member applying impacts against a workpiece.
Figure 3:
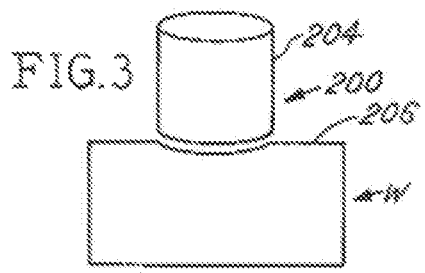
FIG. 3 is a schematic side view of a driven member transmitting impact energy to a workpiece.

Referring to FIGS. 2 and 3, an apparatus 200 is provided for changing physical characteristics of a metal workpiece. The workpiece W is securely positioned upon a support 202. Although the support 202 is shown in the accompanying drawings as being in a horizontal position, it is to be understood that the support 202 for the workpiece W may be in a substantially vertical position and virtually at any angle between the vertical and horizontal positions of the workpiece W. A driven member 204 is provided to transfer the energy generated from the rotary impact device shown in FIG. 1 through multiple impacts to the surface 206 of the workpiece W. The driven member 204 may or may not have a hardness greater than that of the workpiece W. The driven member 204 may be made from a single material or a combination of materials in series. The multiple impacts from the driven member 204 change physical characteristics or effects of the workpiece W until a final useful component or part, such as for use on an aircraft, is achieved.

As disclosed, the workpiece W may have a variety of geometries, including length. Each support 202 has certain dimensions and is able to receive and process each workpiece W. For example, in some cases, a workpiece W may be impacted in its entirety on a given support 202 by the driven member 204. In other cases, a lengthy workpiece W may be processed in consecutive sections of the same workpiece. The leading section of such a lengthy workpiece W may be processed while being secured on the support 202. The leading section is moved forward while adjacent trailing sections of similar dimensions are impacted in a stepwise manner.

In all of the workpieces W being processed, each workpiece W is supported in a fixed position during impacting by the driven member 204 over the entire surface 206 which is the equivalent of the impact coverage area. As to be described hereinafter in detail, in some embodiments, the driven member 204 is controlled by a manipulator and an end effector for impacting the entire coverage area of an entire workpiece W or of each section of a lengthy workpiece W while being secured in position.

Referring to FIG. 3, the driven member 204 applies multiple impacts to the surface 206 of a workpiece W and creates impact energy that moves as a stress wave from the driven member 204 to the surface of the workpiece W. The stress wave is then transferred from the surface 206 into a depth of the workpiece W to create a residual compressive stress or an internal compressive layer that persists within the workpiece W. The relationship of the compressive layer to a co-developed compensatory tensile layer of the workpiece W acts to change the workpiece into a component having changed physical characteristics or effects such as a desired contour for a desired final component.

The following description of the apparatus 200 provides details of one type of device 210 for driving the driven member 204 and of multiple possible types of supports 202 for the workpiece W. These descriptions will be followed by a description of the method of operation of the apparatus 200 by reference to the flow diagram shown in FIG. 13.

Referring to FIG. 1, one example of a device, generally 210, for applying multiple impacts by the driven member 204 on a workpiece W is shown. The illustrated example device 210 is electrically driven. Such a device 210 may also be driven hydraulically or pneumatically. It is to be understood that other types of devices may be utilized provided that any such other device is capable of generating and imparting an impact energy into and through the driven member 204. The illustrated device 210 is a crank mechanism and includes a housing 212. The housing 212 has a rotatable crank 214 that is connected to a shaft (not shown) connected to an electric drive motor (not shown). The crank 214 provides multiple beats per minute by the driven member 204 on the surface 206 of the workpiece W and initially provides a driving force for a piston 216. The piston 216 is reciprocally mounted within the housing 212 and has an O-ring 218 bearing against the cylindrical interior wall of the housing 212.

Spaced from the piston 216 is a ram 220, which is reciprocally mounted within the housing and has an O-ring 218 thereon. The ram 220 cooperates with the piston 216 to form an air spring 222 therebetween. The air spring 222 drives the ram 220 which accelerates a beat-piece 224. The air spring 222 drives the ram 220 against a beat-piece 224 when it is moving forward and retrieves the ram 220 when the piston 216 retracts. The beat-piece 224 includes a pair of O-rings 218 for sealing against the housing 212. The beat-piece 224 transfers energy of the ram 220 to an end of the driven member 204 which applies multiple impacts against the workpiece W. The impacts provide energy for moving a stress wave through the driven member 204 to the surface 206 of the workpiece W.

As described above, and referring to FIG. 7, the device 210 is used to cause multiple impacts by the driven member 204 to be applied against the surface 206 of the workpiece W. The following is a discussion of multiple examples of supports 202 for the workpiece W during the impacting by the driven member 204 against the surface 206 of each workpiece W being processed, regardless of the length of the workpiece W. In some cases, the driven member 204 applies impacts across the entire coverage area of the workpiece W, which is secured in position by a support 202 during the entire time that impacts are being applied.

The following description discloses various types of anvils located on the opposite side of the impacts by the driven member 204 against the surface 206 of the workpiece W. Each support 202 to be described functions as an anvil that forcibly opposes the impact side of the workpiece W. When a workpiece W is resting on a flat surface of a support 202 and is processed on the flat surface, portions of the workpiece W begin to rise off the flat surface of the support 202 and a gap forms between the flat surface and the risen portions of the workpiece W. This creates an undesired loss of energy due to the workpiece W vibrating in free air.

In essence, the supports 202 for the workpiece W, to be described in the following examples, reduce such loss of energy. In each example, the support 202 secures the workpiece W during processing. Each support 202 further acts as an anvil on the opposite side of the workpiece W while the driven member 204 is applying multiple impacts to the surface 206 of the workpiece W. Further, clamps of various types cooperate with the supports 202 to secure the workpiece W in place during impacting by the driven member 204. The clamps, to be described later, may be elongated and may protrude for the entire length of the support 202 during impacting by the driven member 204. The clamps are positioned to secure each workpiece at a selected location. In each example of the support 202 that follows, the driven member 204 is being driven by a device, such as the device 210, described above.

Referring to FIG. 7, the workpiece W is mounted on a flat plate 230, which is the support 202 for the workpiece W. The impact energy from the driven member 204 moves as a stress wave to the surface 206 of the workpiece. Clamps 232, which are elongated, secure the workpiece W against the flat plate 230 to thereby avoid the compressive forces from the impacting to raise portions of the workpiece W and create a loss of energy.

Referring to FIG. 8, the support 202 comprises a pair of opposed clamps 234, which are elongated and secure the workpiece W to avoid the raising of the workpiece W during impacting. At least one central clamp 236, which is elongated, is mounted on the opposite side of the workpiece W and acts as an anvil in opposition to the impacts from the driven member 204 against the surface 206 of the workpiece W. The central clamp 236 can also be used to impart a pre-stress to the workpiece W by displacing the central clamp into the workpiece W. A stress wave moves through the driven member 204 to the surface 206 of the workpiece W. A portion of the resulting energy may be transferred into space on the opposite side of the surface of the workpiece W. A pair of optional clamps 238 may be placed on a side of the surface 206 opposite to the clamps 234. The clamps 234 and the clamps 236, 238 secure the workpiece W while reducing the loss of energy by the workpiece W during the impacting of the workpiece W by the driven member 204.

FIG. 9 is another alternative example of supporting a workpiece W. In FIG. 9, a plate 240 is provided with a raised anvil portion 242 which acts in opposition to the driven member 204 impacting the upper surface 206 of the workpiece W. In this example, a pair of biased clamps 244, which are elongated, are provided to secure the workpiece W. Springs 246 bias the clamps 244 to secure the workpiece W against the raised anvil portion 242. In some implementations, the springs 246 may apply a sufficient force against the workpiece W to pre-stress the workpiece W as the workpiece W conforms to the shape of the plate 240. The springs 246 are positioned around a post 248 threaded into a plate 240. The springs 246 are mounted between a head 250 of the post 248 and the clamps 244. A stress wave moves through the workpiece W and into the plate 240 while the workpiece W is being secured. The raised portion 242 acts as an opposing anvil to the impacting by the driven member 204 on the surface 206 of the workpiece W.

FIG. 10 is still another example of a support 202 for the workpiece W. Clamps 260, which are elongated, are mounted against the surface 206 of the workpiece W. On the opposite side of the workpiece W, a clamp 262 is provided in opposition to one clamp 260 acting against the opposite surface of the workpiece W. An optional clamp 264, which may also be elongated, is positioned against the opposite side of the workpiece W in opposition to the clamp 260. A movable anvil 266 is mounted in opposition to the driven member 204 at the opposite side of the workpiece W. The anvil 266 is movable in X, Y and Z directions and acts in opposition to the impacting by the driven member 204 against the surface 206. The workpiece W is secured and there is a reduced loss of energy of a stress wave that passes to the upper surface 206 of the workpiece W during impacting by the driven member 204.

With reference to FIG. 11, there is still a further example of a support 202 for a workpiece W during processing as the driven member 204 is impacting the surface 206 of the workpiece W. An air bladder anvil 268 is provided on the opposite side of the surface 206 of the workpiece W from the driven member 204 as impacts are applied to the upper surface 206. The air bladder anvil 268, which may be elongated, has an adjustable shape during impacting. A pair of clamps 270, which are elongated, bear against the upper surface 206 of the workpiece W. In some implementations, the clamps 270 can be used to impart pre-stress to the workpiece W. A reduced loss of energy results by holding the workpiece W while the air bladder anvil 268 backs up the workpiece W, and may absorb some of the energy.

Referring to FIG. 12, the structure of the support 202 is similar to that of FIG. 11 in that clamps 274, which are elongated, bear against the surface 206 of the workpiece W. The air bladder anvil 272 of this example is a preformed shaped air bladder anvil, as opposed to the adjustable shape of the air bladder anvil 268 of FIG. 11 and functions in a similar manner as the example of FIG. 11. The clamps 274 secure the surface 206 of the workpiece W to reduce energy loss.

As stated previously, referring to FIG. 13, a flow diagram is shown wherein a controller 280 (e.g., manipulator & end effector controller) is provided for operating a manipulator 286 and an end effector peening device 284. The device 210 and the driven member 204, which form part of the end effector peening device 284, are mounted on the end effector peening device 284 for applying multiple impacts at a given frequency against the surface 206 of the workpiece W. The manipulator 286 locates the end effector and the driven member 204 while the driven member 204 moves across the workpiece W and while the driven member 204 impacts the surface 206 of the workpiece W. The workpiece W is represented as the part 288. A position control 290 is also identified in the flow diagram of FIG. 13. The method of operation for changing physical characteristics of the workpiece W or part 288 will be described with reference to the flow diagram FIG. 13. Each operating feature shown in the flow diagram will be briefly described along with each of their functions while referring also to previously described operating components.

The position control 290 locates the position of the workpiece W or part 288 positioned on a support 202. Once the workpiece W is securely mounted on the support 202, the position location of the workpiece W is communicated to the controller 280. The controller 280 receives the workpiece W position and the path data from a system control (not shown in the flow diagram of FIG. 13). The controller 280 drives a motion control system through a programmed path of travel. Additionally, the controller 280 communicates with the end effector peening device or driven member 204 at the current location of the end effector relative to the workpiece W. The manipulator 286 locates and controls the end effector to move in a preplanned motion path. The end effector peening device 284 causes the driven member 204 to apply multiple impacts to the workpiece W as commanded by the controller 280. The driven member 204 moves across the coverage area of the surface 206 of the workpiece W while secured on a support 202 under the control of the end effector and the manipulator which are controlled by the parameters defined below.

In carrying out the method of using the described apparatus for applying impacts to a workpiece W, the workpiece W is securely positioned on a support 202 which may be any one of the above supports 202. The position control 290 provides the controller 280 with the position of the workpiece W on the support 202.

The controller 280 is provided with the adjustable parameters for changing physical characteristics of the workpiece W into a desired final product. The adjustable parameters for changing physical characteristics of the workpiece include an energy level for the impacts, which may be in the range of 1-35 Joules, on the workpiece W, a rate of the reciprocation of impacts on the workpiece W (e.g., the number of impacts being applied to the workpiece per unit time or beats per second), the coverage area of the impacts on the workpiece W, and linear or areal density of impacts (e.g., size of impactor surface, feed rate of manipulator, step-over distance, and area covered per unit time). The energy level for the impacts may be tied to the rate of application of the impacts on the workpiece W. Other parameters include the configuration of the pattern formed by the impacts as they are laid down onto the workpiece W and additional passes or impacts to the same portion of the workpiece W. The impacts are applied by the driven member 204 to the surface of the workpiece W as the end effector and manipulator move the driven member 204 across the entire coverage area or surface 206 of the workpiece W. This occurs when the entire workpiece W or a section thereof has been mounted in a secure position on a support 202, as described above. The device 210 is mounted on the end effector. The driven member 204 of the device 210 is under the control of the controller 280, which further includes the parameters. The impacting is continued until a desired final product has been achieved.

The basic components of both the apparatus and method of the present disclosure have been described above. In selected situations, an added method step and apparatus may be provided for initially pre-loading the workpiece W for forming the workpiece W into a preliminary contour. A description of the pre-loading of the workpiece W for forming a preliminary contour on a workpiece W is described below.

The following disclosure relates generally to impact peening following a pre-loading step. Here, the pre-loading provides a more efficient process, such as a shortened overall processing time, when the pre-loading is performed prior to impacting the workpiece W by the driven member 204. The forming of the workpiece W can be accomplished with less power and with directional bias by the impacting of the workpiece W with the driven member 204 when the workpiece W has first been pre-loaded. For purposes of this application, pre-loading is synonymous with pre-stressing.

Figure 5:
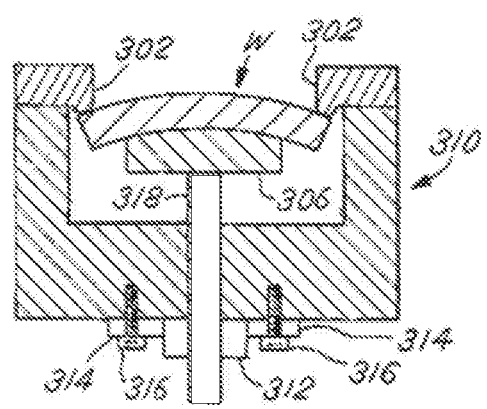
FIG. 5 is a schematic cross-sectional side view, similar to FIG. 4, illustrating another embodiment of a fixture for pre-loading a workpiece.

Referring to FIG. 6, it is schematically shown that by forcibly pressing on the concave side of a workpiece W, as illustrated by an arrow 292, a desired contour is achieved that may be more than the ultimate contour for the workpiece W. As shown in FIG. 5, opposing grippers 302 are applied against the workpiece W, which are illustrated in FIG. 6 by arrows 294. As the impacts are applied to the surface 206 of the pre-stressed workpiece W by the driven member 204, as represented by the arrow 292, the part generally maintains its pre-loaded shape, while the pre-load force is partially offset by the preferential bending moments generated by the process in the part.

Figure 4:
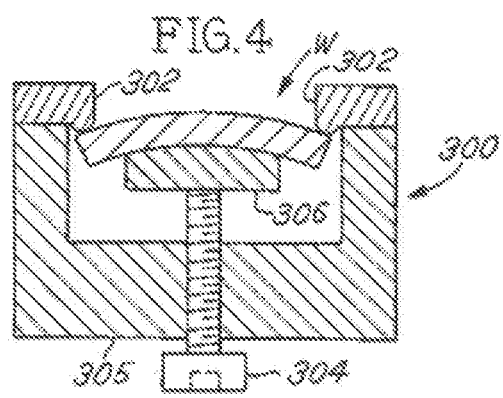
FIG. 4 is a schematic cross-sectional side view illustrating one embodiment of a fixture for pre-loading a workpiece.

FIG. 4 shows a fixture, generally 300, that has elongated grippers 302 fixed at the upper outer portion of the fixture 300 and a threaded bolt 304 is located in the lower, central portion 305 of the fixture 300. A workpiece W is formed in the fixture 300 by a forming member 306, having a contoured upper surface on the underside of the workpiece W. The upper/outer zones of the upper surface of the workpiece W are being held by the grippers 302 as the bolt 304 forces the forming member 306 upwardly against the lower surface of the workpiece W to pre-load the workpiece W.

Referring to FIG. 5, an alternate fixture 310 is shown. Like the fixture 300, the construction of the fixture 310 is substantially the same as fixture 300 except FIG. 5 shows the use of a hydraulic piston assembly 312 that drives the forming member 306 against the lower surface of the workpiece W being pre-loaded in the fixture 310. The hydraulic piston assembly 312 is fixed to the underside of the fixture 310 by an outer flange 314 having threaded bolts 316 secured to the underside of the fixture 310. A piston rod 318 is secured to the underside of the contoured forming member 306. Again, the upper/outer zones of the upper surface of the workpiece are being held by the grippers 302 as the piston rod 318 forces the forming member 306 upwardly against the lower surface of the workpiece to pre-load the workpiece W.

The workpiece W is first pre-loaded for forming a preliminary contour on the workpiece W, such as shown in FIGS. 4, 5 and 6, that does not exceed the elastic limit of the workpiece W. While pre-loaded, the workpiece W or a section of a workpiece is processed by applying multiple impacts from the driven member 204 against the convex side of the workpiece W. The processing of the pre-loaded workpiece W is continued in the manner described above relative to multiple impacts applied by the driven member 204 with the impacts being applied to the convex side of the workpiece W, such as seen in FIGS. 4 and 5.

Figure 16A:
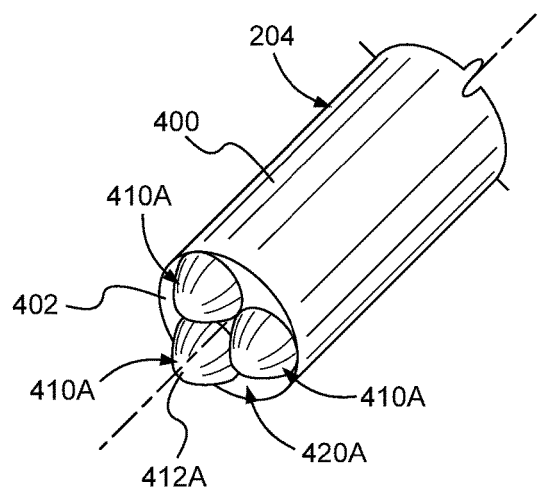
FIG. 16A is a perspective view of a portion of a driven member that includes a plurality of round impact features arranged in a pattern according to one embodiment.

Referring to FIG. 16A, in some embodiments, the driven member 204, or impactor, includes a shaft 400 with an impact end 402. The shaft 400 can have any of various sizes and cross-sectional shapes. In the illustrated embodiment, the shaft 400 is cylindrical. More specifically, the shaft 400 can be elongate in a lengthwise direction (e.g., parallel to a driving direction 430 shown in FIGS. 17A-C and parallel to the central axes of the shaft 400 shown in FIGS. 16A-16B) and has a substantially circular cross-sectional shape. The shaft 400 protrudes lengthwise from a proximal end directly coupled to a metal peening machine to the impact end 402, otherwise known as a distal end of the shaft. The impact end 402, in the illustrated embodiment, defines a substantially flat surface that remains parallel to the surface of the workpiece W being impacted by the driven member 204. In other words, the flat surface of the impact end 402 is substantially perpendicular to a driving direction 430 of the driven member when driven by the metal peening machine. The driving direction 430 is defined as the direction of the motion of the driven member 204 as it is driven into contact with the workpiece W. Accordingly, as defined, the driving direction 430 is perpendicular to the surface of the workpiece W being impacted by the driven member 204. The flat surface of the impact end 402 can have the same shape as the cross-sectional shape of the shaft 400, which in the illustrated implementation is circular. In some implementations, the impact end 402 may be defined by a non-flat surface, such as a spherically radiused surface.

As defined herein, the driven member 204 includes the shaft 400, the impact end 402, and the impact features as described below. As shown in FIG. 1, the driven member 204 can include structure directly or integrally coupled to a drive mechanism, such as the device 210. For example, in some implementations, the shaft 400, impact end 402, impact features, and structure directly coupled to the drive mechanism, can be formed as a single, monolithic, and one-piece unit to form the driven member 204.

Alternatively, the driven member 204 can be formed separately from the structure directly coupled to the drive mechanism, and coupled to the structure. For example, the driven member 204 can be a pin or impactor that is removably secured to a structure directly coupled to the drive mechanism. In such implementations, the driven member 204, or the shaft 400 of the driven member, may include features (e.g., flutes, splines, notches, etc.) for coupling the driven member to a drive mechanism. The driven member 204 can be removably coupled to the drive mechanism via a coupling mechanism, such as a quick-release mechanism.

Coupled to and protruding from the impact end 402 of the shaft 400 is one or a plurality of impact features 410A. Each of the impact features 410A defines an impact surface 412A, which directly contacts the surface of the workpiece W when impacted by the driven member 204. In other words, because the impact features 410A protrude from the impact end 402 of the shaft 400, only the impact surfaces 412A of the impact features directly impact the workpiece W. Accordingly, in some implementations, the impact end 402 of the shaft does not contact the surface of the workpiece W when impacted by the driven member 204. The impact features 410A can be coupled to the impact end 402 by being co-formed with the shaft 400 to form a one-piece monolithic construction with the shaft. Alternatively, the impact features 410A can be formed separately from the shaft 400 and later coupled to the shaft.

The impact surfaces 412A can have any of various peripheral shapes. As defined herein, the peripheral shape of an impact surface is the shape of a periphery of the impact surface, and does not refer to the flatness or curvature of the impact surface. In other words, the peripheral shape of an impact surface is the shape of the impact surface when viewed perpendicularly from a plane parallel to the impact end 402 or perpendicular to the driving direction 430, such as the view in FIGS. 18A, 18B, and 20A-D. The peripheral shape of each impact surface 412A of the impact features 410A is circular and symmetrical. However, as will be described below, the peripheral shape of the impact surfaces 412A can be non-circular and/or asymmetrical.

Figure 16B:
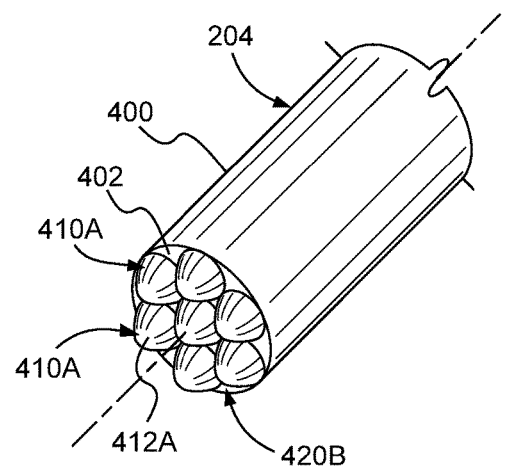
FIG. 16B is a perspective view of a portion of a driven member that includes a plurality of round impact features arranged in a pattern according to another embodiment.
Figure 16C:
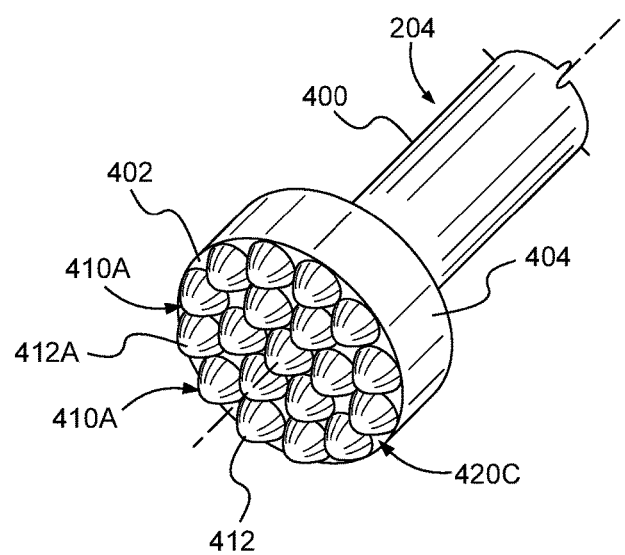
FIG. 16C is a perspective view of a portion of a driven member that includes a plurality of round impact features arranged in a pattern according to yet another embodiment.
Figure 19A:
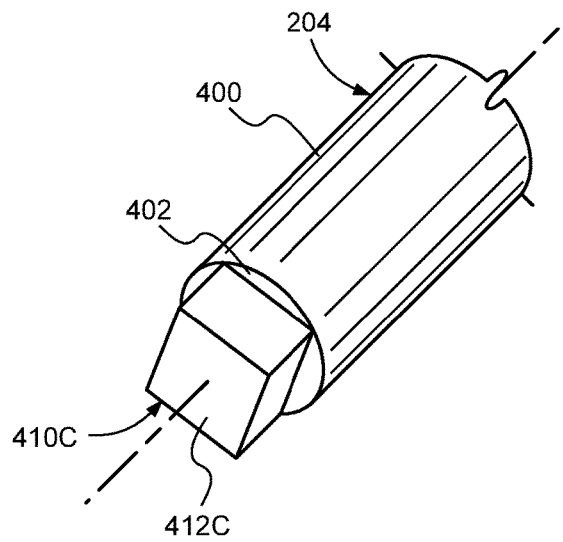
FIG. 19A a perspective view of a portion of a driven member that includes a single square impact feature according to one embodiment.
Figure 19B:
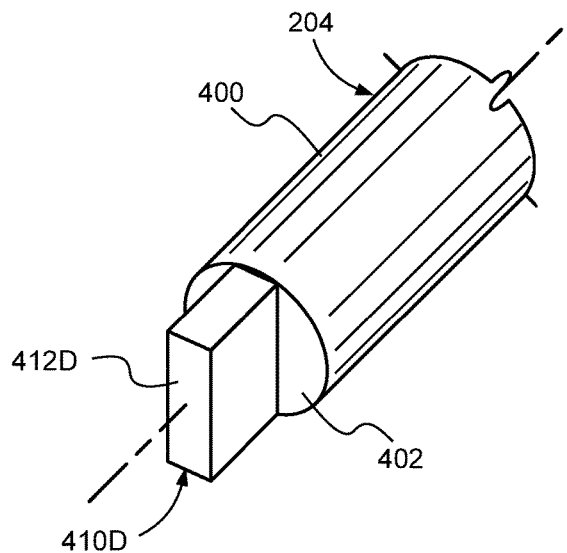
FIG. 19B a perspective view of a portion of a driven member that includes a single rectangular impact feature according to one embodiment.
Figure 19C:
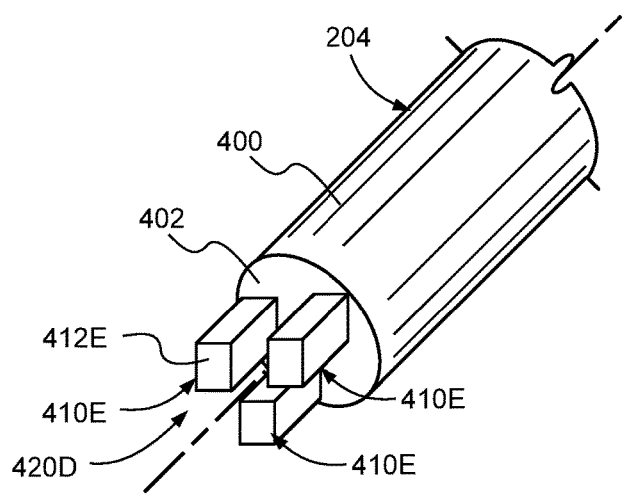
FIG. 19C a perspective view of a portion of a driven member that includes a plurality of square impact features according to one embodiment.

Each impact surface 412A of the impact features 410A can have a contour shape that is flat or non-flat (e.g., curved or rounded). In other words, as an impact surface extends within its peripheral shape, the contour of the impact surface may be flat or non-flat. As defined herein, the contour shape of an impact surface of an impact feature is the shape of the impact surface when viewed perpendicularly from a plane perpendicular to the impact end 402 or parallel to the driving direction, such as the view in FIGS. 17A-C. As will be described below in more detail, in some implementations, such as shown in FIGS. 19A-C, the impact surfaces of the illustrated impact features are substantially flat. However, in other implementations, such as shown in FIGS. 16A-C, the impact surfaces of the illustrated impact features are substantially rounded to form domed or hemispherical bumps. More specifically, referring to FIG. 17A, each impact surface 412A of the features 410A has a contour shape that is substantially curved. The curvature of the contour of the impact surface 412A helps to distribute the impact energy from the driven member 204 to the workpiece W and change the physical characteristics of the workpiece W in a more efficient and controlled manner.

Although the impact end 402 of the shaft 400 has a plurality of impact features 410A each with a round peripheral shape and curved contour shape, in some implementations, such as shown in FIG. 3, the impact end of the shaft can have a single impact feature 410A with a round peripheral shape and curved (e.g., rounded, domed, hemispherical, etc.) contour shape. The single impact feature 410A of such an implementation may define an impact surface 412A with a curved contour shape having a radius between a radius of the shaft 400 and a radius much larger than the radius of the shaft.

The plurality of impact features 410A of each driven member 204 can include two or more impact features arranged about the impact end 402 of the shaft 400 in any of various patterns. The patterns can be symmetrical patterns or non-symmetrical patterns. As defined herein, a pattern is symmetrical if the pattern is symmetrical about at least one line (e.g., line of symmetry) parallel to the impact end 402, and non-symmetrical if the pattern is not symmetric about any line parallel to the impact end. Additionally, the patterns may include uniformly spaced or non-uniformly spaced impact features. Impact features of a pattern are uniformly spaced if the spacing or distance between directly adjacent impact features is the same.

Referring to FIGS. 16A-C, the plurality of impact features 410A are uniformly spaced about the impact end 402 in different symmetrical patterns 420A-C, respectively. As shown in FIG. 16A, the pattern 420A includes three impact features 410A uniformly spaced apart about the impact end 402 in a symmetrical manner. Like the pattern 420A, the patterns 420B, 420C of impact features 410A in FIGS. 16B and 16C, respectively, also are symmetrical with uniformly spaced impact features. However, unlike the pattern 420A, the pattern 420B has a higher quantity of impact features 410A than the pattern 420A, and a single impact feature centrally located on the impact surface 402. The pattern 420C is similar to the pattern 420B, but with a higher quantity of impact features 410A.

As shown in FIG. 16C, in some implementations, the driven member 204 may include an impact head 404 coupled to the shaft 400. The impact head 404 defines an impact end 402 similar to the impact ends 402 of FIGS. 16A and 16B. However, the impact head 404 is sized bigger than the shaft 404 to define a larger cross-sectional area than the shaft 400, and thus a larger impact end 402. In some implementations, the larger impact end 402 of the impact head 404 is conducive to accommodating patterns with higher quantities of impact features. The impact head 404 can be separately formed and attached to the shaft 400, or formed together with the shaft 400 to form a monolithic one-piece construction.

The uniform spacing of the impact features 410A results in a uniform distribution of impacts, which may provide a substantially uniform distribution of energy to the workpiece W, but does not provide directionality to the transmitted energy. Rather, in certain implementations, directionality of the transmitted energy is supplied via pre-loading the workpiece W as described above.

Figure 18A:
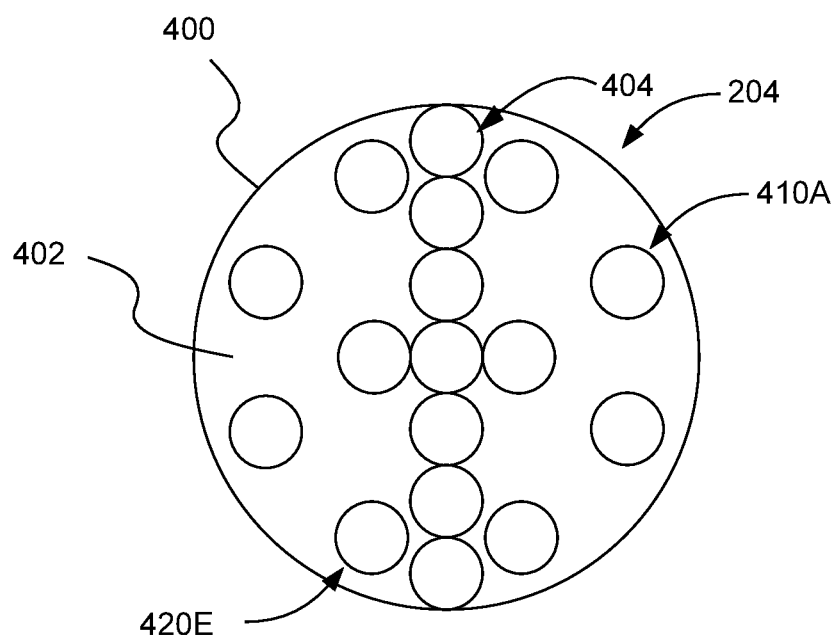
FIG. 18A is a bottom plan view of a driven member that includes a plurality of round impact features according to one embodiment.

Referring to FIG. 18A, the plurality of impact features 410A are non-uniformly spaced about the impact end 402 of the shaft 400 in a symmetrical pattern 420E. Similar to FIGS. 16A-C, the impact features 410A of the pattern 420E each has an impact surface with a round or circular peripheral shape. However, the distances between directly adjacent impact features 410A of the pattern 420E vary. For example, the distance between directly adjacent impact features 410A along a diameter of the impact end 402 is smaller than the distance between directly adjacent impact features about the periphery of the impact end. Notwithstanding the non-uniform spacing of the impact features 410A, the pattern 420E is still symmetrical about at least one line extending parallel to the impact end 402 (e.g., along a diameter of the impact end).

The non-uniform spacing of the impact features 410A of the pattern 420E, and other patterns with non-uniformly spaced impact features, may help to provide directionality to the energy transmitted to the workpiece W from the driven member 204. For example, non-uniform spacing of the impact features 410A results in non-uniform distribution of energy to the workpiece W, which if controlled properly can assist in deforming the workpiece W in a particular manner or direction. Providing directionality to the transmitted energy via the configuration of the impact features reduces, and in some instances eliminates, the need for pre-loading the workpiece W. Accordingly, configuring the impact features of the driven member 204 to provide directionality assists in reducing the complexity, cost, and efficiency of metal peening metallic workpieces. The symmetry of the pattern 420E results in a symmetrical distribution of the energy into the workpiece W and a symmetrical deformation of the workpiece W. It is recognized that the symmetrical pattern 420E with non-uniform spacing of the impact features 410A shown in FIG. 18A is merely one example, and that in other examples any of various other symmetrical patterns with non-uniform spacing of the impact features can be used.

Figure 18B:
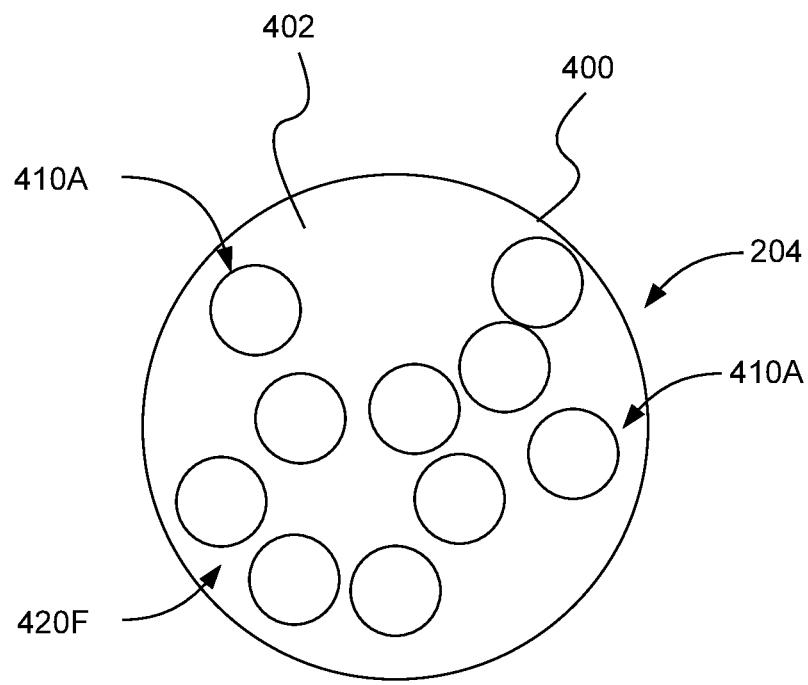
FIG. 18B is a bottom plan view of a driven member that includes a plurality of round impact features according to another embodiment.

Now referring to FIG. 18B, the plurality of impact features 410A are non-uniformly spaced about the impact end 402 of the shaft 400 in a non-symmetrical pattern 420F. Similar to the pattern 420E, the non-uniform spacing of the pattern 420F can assist in deforming the workpiece W in a particular manner or direction. However, unlike the pattern 420E, use of the pattern 420F results in a non-symmetrical distribution of the energy into the workpiece W, and thus a non-symmetrical deformation of or dent in the workpiece W. Although FIG. 18 illustrates one particular embodiment of a non-symmetrical pattern 420F with non-uniform spacing of the impact features 410A, in other embodiments, other non-symmetrical patterns with non-uniform spacing of the impact features can be used.

Figure 17C:
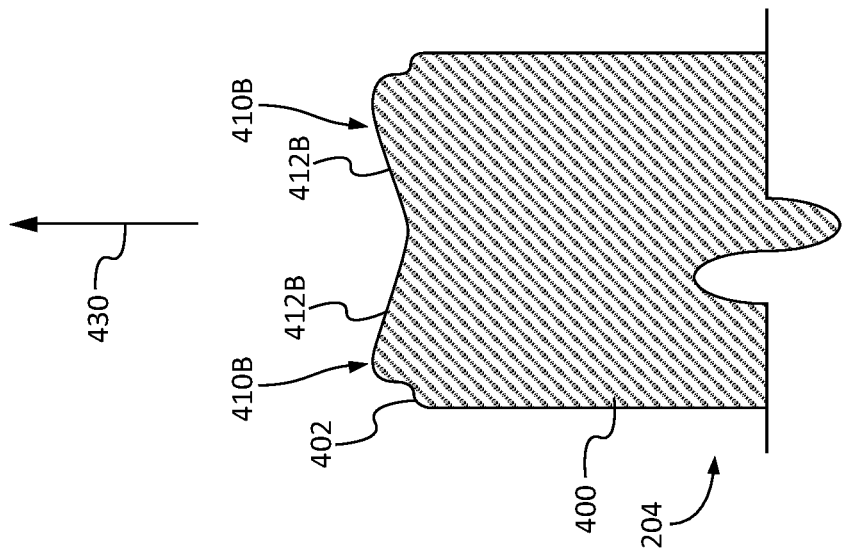
FIG. 17C is a cross-sectional side view of a portion of a driven member that includes a plurality of impact features according to yet another embodiment.
Figure 17B:
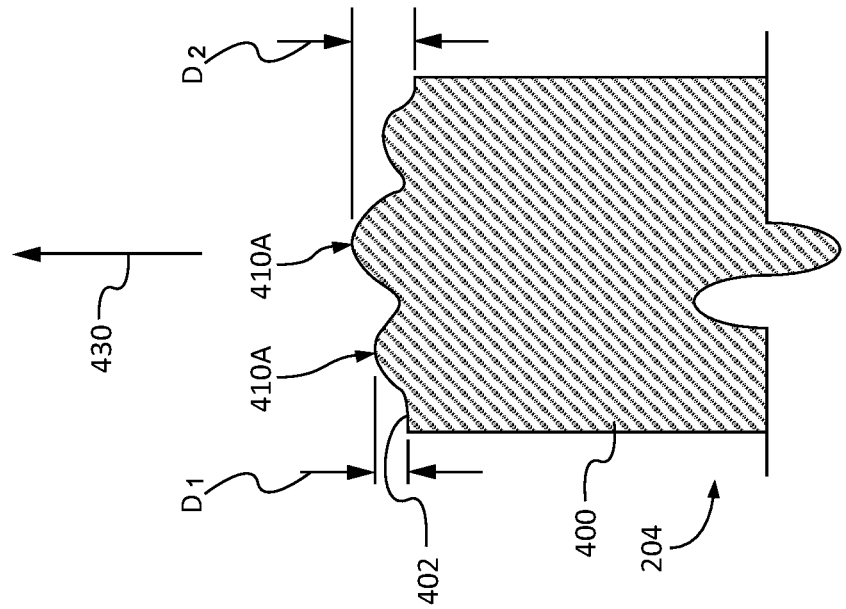
FIG. 17B is a cross-sectional side view of a portion of a driven member that includes a plurality of round impact features according to another embodiment.

Although the shape of the impact features 410A of the patterns in FIGS. 16A-C, 18A, and 18B is the same, in some embodiments, the size of the impact features 410A of the patterns may be different. The height of an impact feature can be defined as the distance between the impact surface 402 and a distal end of the impact feature, or the distance the impact feature protrudes from the impact surface. Alternatively, the height of an impact feature may be defined as a distance away from a plane perpendicular to the driving direction 430 of the driven member 204. Referring again to FIG. 17A, the heights of the impact features 410A of the illustrated pattern are the same. However, as shown in FIG. 17B, the heights of the impact features 410A of the illustrated pattern are different with a middle one of the impact features having a height greater than the heights of the adjacent two impact features. In other words, at least one of the impact features 410A of the pattern in FIG. 17B protrudes a distance $D_1$ away from the impact surface 402 and at least one of the impact features of the same pattern protrudes a different distance $D_2$ away from the impact surface. In the illustrated embodiment, the distance $D_1$ is less than the distance $D_2$. Varying the heights of the impact features as shown in FIG. 17B may help to promote directionality of the impact energy transmitted into the workpiece W as discussed below.

Figure 17A:
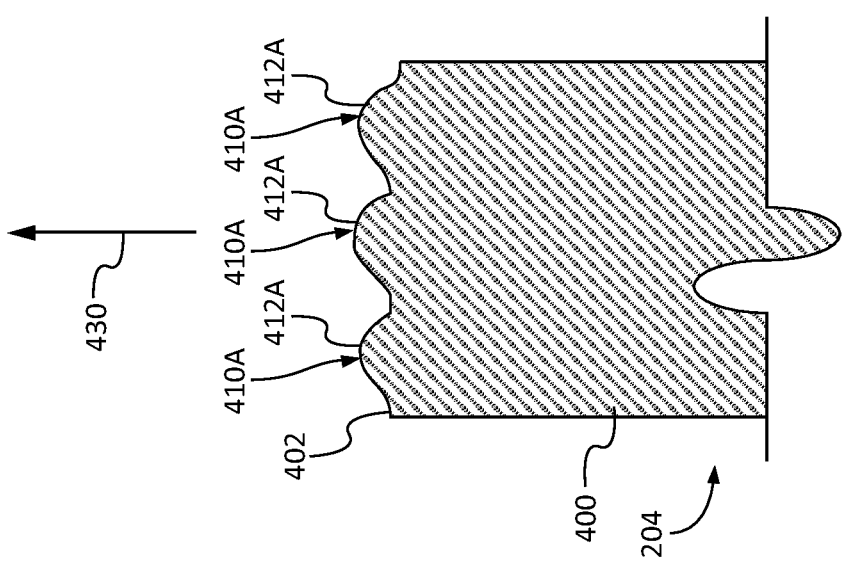
FIG. 17A is a cross-sectional side view of a portion of a driven member that includes a plurality of round impact features according to one embodiment.

Directionality of the impact energy can also be promoted by configuring the impact features to have impact surfaces with asymmetrical contour shapes. The contour shapes of the impact surfaces 412A of the impact features 410A are symmetrical about a line extending parallel to the driving direction 430 as shown in FIGS. 17A and 17B. However, referring to FIG. 17C, the contour shapes of impact surfaces 412B of the impact features 410B are asymmetrical about a line extending parallel to the driving direction 430. Although one particular asymmetrical shape is shown in FIG. 17C, the impact features can have impact surfaces with any of various asymmetrical contour shapes.

The patterns described above, as illustrated in FIGS. 16A-C, 18A, and 18B, include a plurality of impact features 410A each with an impact surface 412A having a round or circular peripheral shape. In fact, as illustrated, every impact feature 410A of the patterns of FIGS. 16A-C, 18A, and 18B has an impact surface with a round peripheral shape. However, in some embodiments, the driven member 204 may have an impact feature with an impact surface that has a non-round peripheral shape. For example, referring to FIG. 19A, the driven member 204 has a single impact feature 410C with an impact surface 412C having a square peripheral shape. In other words, the periphery of the impact surface 412C is square. Furthermore, the contour shape of the impact surface 412C is substantially flat in the illustrated embodiment. Although in other embodiments, the contour shape of the impact surface 412C can be round or curved. In yet certain implementations, most of the impact surface 412C has a contour shape that is flat, with the edges defining the transition between sides of the impact feature 410C and the impact surface 412C being radiused. The square peripheral shape of the impact surface 412C may act to impart at least some directionality to the energy transmitted into the workpiece W upon impact with the workpiece W. For example, the energy transmitted to the workpiece W proximate the corners of the square peripheral shape of the impact surface 412C is greater than proximate the sides of the square peripheral shape.

According to another example, as shown in FIG. 19B, the driven member 204 has an impact feature 410D with a single impact surface 412D having a rectangular peripheral shape. The rectangular shape of the periphery of the impact surface 412D enhances the directionality of the energy transmitted into the workpiece W by distributing more of the energy to the elongated sides of the rectangular shape than at the ends.

Referring to FIG. 19C, the driven member 204 includes a plurality of impact features 410E each with an impact surface 412E having a square peripheral shape. The impact features 410E are arranged in a pattern 420D. Although the pattern 420D includes three impact features 410E uniformly spaced about the impact surface 402 in a symmetrical manner similar to FIG. 16A, in some embodiments, the driven member 204 can have any of various symmetrical or non-symmetrical patterns of impact features 410E uniformly or non-uniformly spaced about the impact surface 402, such as shown and described above.

Now referring to FIGS. 20A-C, a driven member 204 may include a plurality of impact features each with an impact surface having any of various non-round peripheral shapes. For example, in FIG. 20A, the driven member 204 includes a pattern 420G of at least one impact feature 410A with a round impact surface 412A and at least one impact feature 410F with a non-round impact surface 412F. In other words, the pattern 420G includes impact features with a first peripheral shape and impact features with a second peripheral shape that is different than the first peripheral shape. The non-round peripheral shape of the impact surfaces 412F of the illustrated impact features 410F is ovular (e.g., elliptical or racetrack shaped) and can be symmetric. Similar to the rectangular shape of the impact surface 412D of the impact feature 410D shown in FIG. 19B, the ovular shape of the impact surface 412F of each impact feature 410F may facilitate directionality of the energy transmitted into the workpiece W by distributing more of the energy towards the elongated sides of the ovular shape than at the smaller radiused ends of the ovular shape. Further, the use of impact features with differently-shaped impact surfaces in the pattern 420G may help to facilitate directionality of the energy transmitted into the workpiece W by creating a non-uniform distribution of the energy.

As another example, referring to FIG. 20B, the pattern 420H includes a plurality of impact features 410G with impact surfaces 412G having a different non-round peripheral shape compared to the impact surfaces 412F of the impact features 410F. Each of the impact features 410G forms a long, thin ridge that extends across the impact surface 402 from one side of the impact surface to an opposing side of the impact surface. Although not necessary, in the illustrated embodiment, the ridges of the impact features 410G extend linearly and are arranged parallel to each other in a spaced-apart manner. The ridges can be symmetrical as shown. Further, in the illustrated embodiment, the ridges of the impact features 410G have different lengths with the lengths of the ridges getting smaller away from a central ridge extending diametrically across the impact surface 402. Although not shown, in some implementations, the ridges are not linear, but curve as they extend across the impact surface 402. The elongate, thin peripheral shape of the impact surfaces 412G of the illustrated impact features 410G facilitates directionality of the energy transmitted into the workpiece W.

In yet another example, referring to FIG. 20C, the pattern 420I includes a plurality of impact features 410H with impact surfaces 412H having a non-round and non-symmetric peripheral shape. Although the illustrated impact surfaces 412H have a distinct non-symmetrical peripheral shape, in other embodiments, the impact surfaces can have any of various other non-symmetrical peripheral shapes based on a desired directionality of the energy transmitted into the workpiece W. Further, although the driven member 204 includes a pattern of a plurality of impact features with non-symmetrical shapes, it is recognized that in some embodiments a driven member may include only a single impact feature with a non-symmetrical shape.

As mentioned above, the use of a plurality of impact features on the impact surface 402 of the driven member 204, as opposed to a single impact surface, distributes the impact energy from the driven member across the plurality of impact surfaces. Because the entirety of the impact energy from the driven member is not concentrated on a single impact surface, but rather is spread out over multiple impact surfaces, the impact energy transmitted into the workpiece W by each impact surface is less than the overall impact energy provided by the driven member. Accordingly, the threat of over-impacting the workpiece W by imparting too much impact energy to the workpiece W, thereby damaging the workpiece W, is reduced with the use of a plurality of impact features. The higher the quantity of impact features, the greater the distribution of the impact energy, or the lower the amount of impact energy imparted to the workpiece W by each individual impact feature. Additionally, in some implementations, the higher the quantity of impact features, the more uniform the appearance on the surface of the workpiece W following an impact.

Figure 20D:
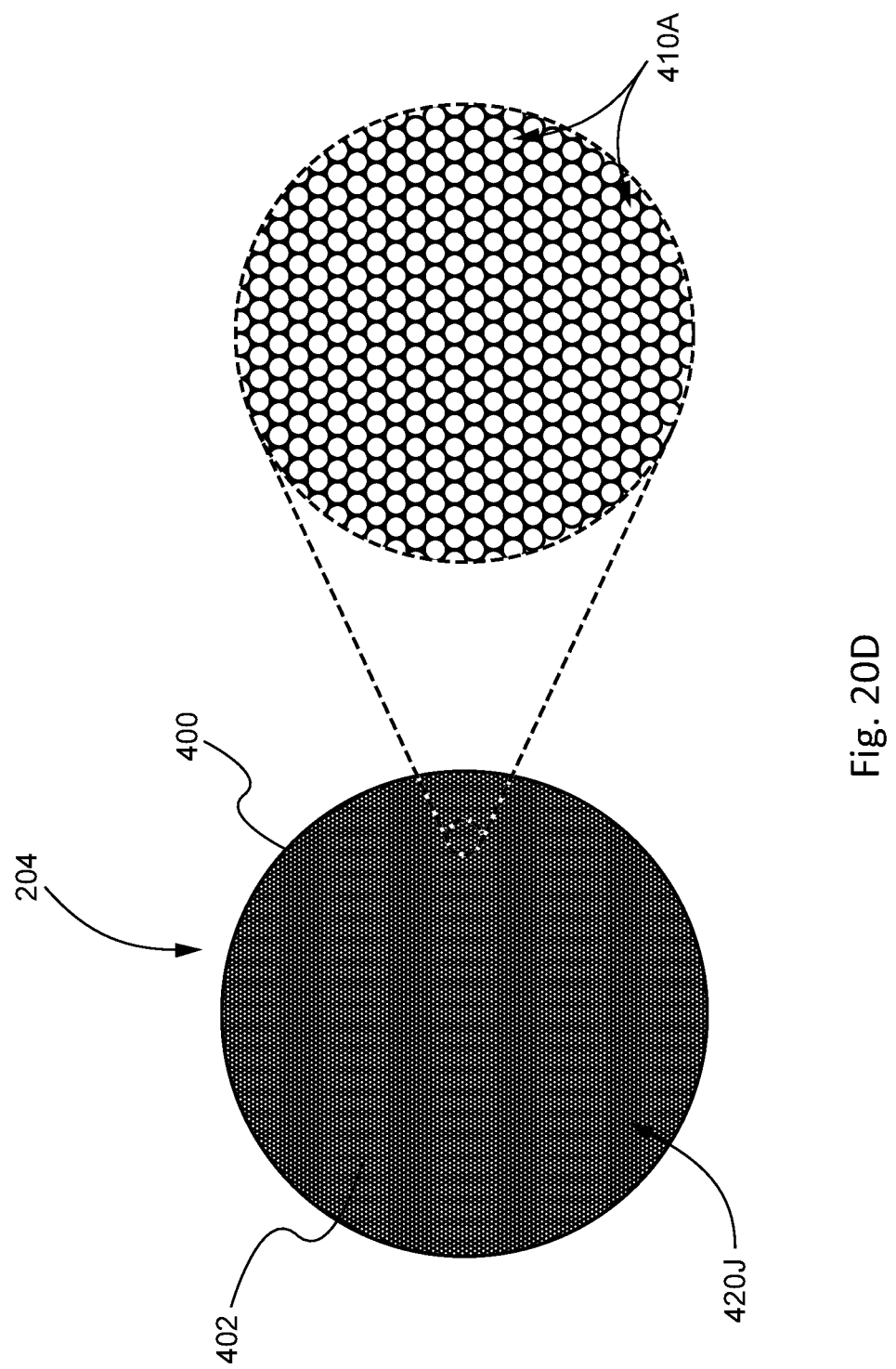
FIG. 20D is a bottom plan view of a driven member that includes a plurality of round impact features arranged in a textured pattern according to one embodiment.

In view of the foregoing, in some embodiments, such as shown in FIG. 20D, the impact surface 402 of the shaft 400 may be textured to optimize the distribution of the impact energy. The textured impact surface 402 of the shaft 400 of FIG. 20D is formed by a pattern 420I of impact features protruding from the impact surface. The configuration of each impact feature of the pattern 420J can be similar to any of the various impact features as discussed above. For example, as shown, the pattern 420J can include a plurality of impact features 410A with impact surfaces having a round peripheral shape. However, in contrast to the illustrated patterns shown and described above, the pattern 420J has a significantly higher quantity of impact features. The quantity of the impact features of the pattern 420J is high enough to give off the appearance of a textured surface. For example, the pattern 420J may have a quantity of impact features equal to or greater than 100 to 10,000 impact features. The impact features of the pattern 420J can have impact surfaces with peripheral shapes that are symmetrical or non-symmetrical, and the pattern 420J can be symmetrical or non-symmetrical, to facilitate directionality of the impact energy as has been discussed above in detail.

In some embodiments, a metal peening machine that includes a metal peening device, such as device 210, is used to drive into a workpiece W a driven member 204 with at least one impact feature as described above. The metal peening machine may include a plurality of driven members each with one or more differently configured impact features that are interchangeably coupleable to the metal peening machine to be driven into a workpiece W. Although the impact features are configured differently, each of the driven members include identical machine coupling features that allow each of the driven members to be coupled to the metal peening machine in the same manner. Accordingly, each of the plurality of driven members can be interchangeably coupled to the metal peening machine.

According to certain embodiments, a method of using the metal peening machine to deform a metal workpiece W includes setting impact characteristics of the metal peening machine in response to the configuration of the impact feature(s) of the driven member. In other words, in some implementations, the impact characteristics of the metal peening machine are tied (e.g., proportional) to the configuration of the impact feature(s) of the driven member. Because a driven member with multiple impact features distributes impact energy over multiple impact surfaces, the metal peening machine can be set to impart a higher overall impact energy or impact reciprocation rate to the workpiece W without plastic deformation of the workpiece W reaching an undesirable depth into the workpiece W. In some instances, the overall impact energy or impact reciprocation rate of the driven member imparted by the metal peening machine would result in plastic deformation of the workpiece W reaching an undesirable depth into the workpiece W with a conventional driven member without an impact feature as disclosed herein.

In one implementation of the method, the metal peening machine is driving, at a first overall impact energy, first impact reciprocation rate, first feed rate at which the manipulator moves the end effector, and a first step-over distance between rows of impacts, a first driven member with a first configuration of at least one impact feature into a workpiece W. The combination of impact reciprocation rate and feed rate results in an overall impacts applied per distance travelled over the workpiece W, which, when coupled with the step-over distance, is closely related to overall impact energy. Then, the first driven member is replaced with a second driven member with a second configuration of at least one impact feature. Before driving the second driven member into the workpiece W, at least one of the first overall impact energy, first impact reciprocation rate, first feed rate, and first step-over distance is changed to a second overall impact energy, second impact reciprocation rate, second feed rate, and second step-over distance, respectively. With the metal peening machine set to impart the second overall impact energy, second impact reciprocation rate, second feed rate, or second step-over distance, the metal peening machine then drives the second driven member into the workpiece W. The second overall impact energy can be more or less than the first overall impact energy, the second impact reciprocation rate can be more or less than the first impact reciprocation rate, the second feed rate can be more or less than the first feed rate, and the second step-over distance can be more or less than the first step-over distance. In one implementation, the second configuration of the at least one impact feature includes more impact features than the first configuration, and either the second overall impact energy is higher than the first overall impact energy, the second impact reciprocation rate is higher than the first impact reciprocation rate, the second feed rate is lower than the first feed rate, or the second step-over distance is smaller than the first step-over distance. Although overall impact energy, impact reciprocation rate, feed rate, and step-over distance have been discussed, other impact characteristics of the metal peening machine can be set in response to the configuration of the impact features of the driven member.

Alternatively, in some implementations of the method, when a change to the deformation characteristics is desired, either the impact characteristics of the metal peening machine are changed with the same driven member, or the impact characteristics of the metal peening machine are held constant and the driven member is switched to another driven member with a different impact feature configuration.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described embodiments are to be considered in all respects only as illustrative and not restrictive. All changes which come within the meaning and range of equivalency of the claims are to be embraced within their scope.

What is claimed is:

1. A driven member of a metal peening machine, the metal peening machine being configured to drive the driven member, in a driving direction, into contact with a work surface of a metal workpiece to deform the metal workpiece, the driven member comprising:
    a shaft comprising an impact end; and
    a plurality of impact features, wherein each one of the plurality of impact features:
        is coupled to and protrudes, in a direction, a distance from the impact end of the shaft;
        comprises an impact surface to be driven into contact with the work surface of the metal workpiece, the impact surface being one of flat or rounded;
        has a width, perpendicular to the direction and at least as great as the distance; and
        is fixed relative to the shaft, such that each one of the plurality of impact features is not movable relative to the shaft;
    wherein:
        the plurality of impact features are arranged, about the impact end, in a pattern which is asymmetrical relative to any possible plane, parallel to the direction, that bisects the pattern;
        at least one of the impact features of the plurality of impact features defines an impact surface with a non-circular peripheral shape in a plane perpendicular to the driving direction; and
        the non-circular peripheral shape of the impact surface is asymmetrical.

2. The driven member of claim 1, wherein the plurality of impact features are non-uniformly spaced about the impact end.

3. The driven member of claim 1, wherein each of the plurality of impact features comprises a rounded bump protruding from the impact end of the shaft.

4. The driven member of claim 1, wherein the plurality of impact features collectively define a textured impact surface.

5. The driven member of claim 1, wherein at least one of the plurality of impact features comprises an elongated ridge.

6. The driven member of claim 1, wherein at least one of the plurality of impact features protrudes from the impact end a first distance, and at least a second one of the plurality of impact features protrudes from the impact end a second distance, and wherein the first distance is different than the second distance.

7. The driven member of claim 1, wherein at least one of the impact features of the plurality of impact features defines an impact surface having a first peripheral shape, and at least a second one of the impact features of the plurality of impact features defines an impact surface having a second peripheral shape, wherein the first peripheral shape is different than the second peripheral shape.

8. The driven member of claim 1, wherein at least one of the impact features of the plurality of impact features defines an impact surface that has an elliptical peripheral shape.

9. The driven member of claim 1, wherein at least one of the impact features of the plurality of impact features defines an impact surface that has a rectangular peripheral shape or square peripheral shape.

10. The driven member of claim 1, wherein the plurality of impact features comprises a plurality of elongated ridges.

11. The driven member of claim 1, wherein at least one of the impact features of the plurality of impact features has an asymmetrical peripheral shape of in a plane parallel to the driving direction.

12. A driven member of a metal peening machine, the metal peening machine being configured to drive the driven member, in a driving direction, into contact with a work surface of a metal workpiece to deform the metal workpiece, the driven member comprising:
    a shaft comprising an impact end; and
    a plurality of impact features, wherein each one of the plurality of impact features:
        is coupled to and protrudes, in a direction, distance from the impact end of the shaft;
        comprises an impact surface to be driven into contact with the work surface of the metal workpiece, the impact surface being one of flat or rounded;

has a width, perpendicular to the direction and at least as great as the distance; and is fixed relative to the shaft, such that each one of the plurality of impact features is not movable relative to the shaft;

wherein:

the plurality of impact features are arranged, about the impact end, in a pattern which is asymmetrical relative to any possible plane, parallel to the direction, that bisects the pattern; and each one of the plurality of impact features has an asymmetrical peripheral shape, in a plane perpendicular to the driving direction or in a plane parallel to the driving direction.

13. A driven member of a metal peening machine, the metal peening machine being configured to drive the driven member, in a driving direction, into contact with a work surface of a metal workpiece to deform the metal workpiece, the driven member comprising:

a shaft comprising an impact end; and a plurality of impact features, wherein:

each one of the plurality of impact features:

is coupled to and protrudes, in a direction, a distance from the impact end of the shaft;

comprises an impact surface to be driven into contact with the work surface of the metal workpiece, the impact surface being one of flat or rounded;

has a width, perpendicular to the direction and at least as great as the distance; and is fixed relative to the shaft, such that each one of the plurality of impact features is not movable relative to the shaft; and at least one of the plurality of impact features defines an impact surface with an asymmetrical shape in a plane perpendicular to the direction.

14. The driven member of claim 13, wherein the plurality of impact features are uniformly spaced about the impact end.

15. The driven member of claim 13, wherein the plurality of impact features are non-uniformly spaced about the impact end.

16. The driven member of claim 13, wherein at least some of the plurality of impact features define an impact surface with an asymmetrical shape in a plane perpendicular to the direction.

17. The driven member of claim 13, wherein all of the plurality of impact features define an impact surface with an asymmetrical shape in a plane perpendicular to the direction.

18. The driven member of claim 13, wherein at least one of the plurality of impact features protrudes from the impact end a first distance, and at least a second one of the plurality of impact features protrudes from the impact end a second distance, and wherein the first distance is different than the second distance.

19. The driven member of claim 13, wherein at least one of the impact features of the plurality of impact features defines an impact surface having a first peripheral shape, and at least a second one of the impact features of the plurality of impact features defines an impact surface having a second peripheral shape, wherein the first peripheral shape is different than the second peripheral shape.

20. The driven member of claim 13, wherein each one of the plurality of impact features comprises a rounded bump protruding from the impact end of the shaft.

* * * * *